United States Patent [19]
Maeda et al.

[11] Patent Number: 5,412,775
[45] Date of Patent: May 2, 1995

[54] DISPLAY CONTROL METHOD AND APPARATUS DETERMINING CORRESPONDING VALIDITY OF WINDOWS OR OPERATIONS

[75] Inventors: Miyuki Maeda, Gardena, Calif.; Khotaro Yamashita, Machida, Japan; Akira Maeda, Gardena, Calif.

[73] Assignee: Hitachi, Ltd., Tokyo, Japan

[21] Appl. No.: 803,766

[22] Filed: Dec. 5, 1991

Related U.S. Application Data

[63] Continuation of Ser. No. 336,069, Apr. 11, 1989, abandoned.

[30] Foreign Application Priority Data

Apr. 13, 1988 [JP] Japan ................................. 63-90874
Jun. 30, 1988 [JP] Japan ................................ 63-164757

[51] Int. Cl.$^6$ ................................................ G06F 3/14
[52] U.S. Cl. ..................................... 395/158; 395/159; 395/157; 345/120; 345/119
[58] Field of Search ............... 395/158, 159, 157, 135, 395/146, 153; 340/721, 734, 723; 345/120, 119, 114, 113, 115

[56] References Cited

U.S. PATENT DOCUMENTS

| | | | |
|---|---|---|---|
| 4,631,531 | 12/1986 | Maeda | 345/186 |
| 4,700,320 | 10/1987 | Kapur | 395/158 |
| 4,736,309 | 4/1988 | Johnson et al. | 395/158 |
| 4,752,773 | 6/1988 | Togawa et al. | 345/115 X |
| 4,779,081 | 10/1988 | Nakayama et al. | 345/120 |
| 4,806,919 | 2/1989 | Nakayama et al. | 345/120 |
| 4,819,189 | 4/1989 | Kikuchi et al. | 395/158 |
| 4,829,294 | 5/1989 | Iwami et al. | 395/157 X |
| 4,885,704 | 12/1989 | Takagi et al. | 345/166 |
| 4,954,818 | 9/1990 | Nakane et al. | 395/158 X |
| 5,091,969 | 2/1992 | Kuwashima | 345/120 X |
| 5,129,055 | 7/1992 | Yamazaki et al. | 395/158 |
| 5,237,653 | 8/1993 | Noguchi et al. | 395/158 |

FOREIGN PATENT DOCUMENTS 59-102284 of 1984 Japan.
62-39978 of 1987 Japan.

*Primary Examiner*—Raymond J. Bayerl
*Attorney, Agent, or Firm*—Fay, Sharpe, Beall, Fagan, Minnich & McKee

[57] ABSTRACT

A method and apparatus can set validity of the operation for a piece of information to be displayed on a display terminal, such as a displaying, scaling or underwriting operation, and to allow the operation of the displayed information responsive to the information indicating the validity. In the operation of a multi-window controlled screen, a desired screen can be easily displayed closest to the user. Moreover, the information displayed on a screen is divided into a constant unit, and the information indicating validity of the operation is caused to correspond to the divided unit. This information is separately displayed to the user as an icon. Then the overwriting, deleting, moving or scale changing operation, or the like, can be accomplished independently of one another so that a desired document can be easily made. If the invention is applied to an electronic mail system, the document can be easily overwritten.

8 Claims, 19 Drawing Sheets

FIG. 2

| DISCRIMINATER | A | B | C | D |
|---|---|---|---|---|
| POSITION X | 10.0 | 10.0 | 20.0 | 10.0 |
| POSITION Y | 10.0 | 10.0 | 15.0 | 10.0 |
| SIZE X | 50.0 | 45.0 | 30.0 | 45.0 |
| SIZE Y | 45.0 | 40.0 | 35.0 | 40.0 |
| ICON (X, Y) | 12.5±2.5, 57.5±2.5 | 17.5±2.5, 57.5±2.5 | 22.5±2.5, 57.5±2.5 | 27.5±2.5, 57.5±2.5 |

FIG. 3

| DISCRIMINATER | A | B | C | D |
|---|---|---|---|---|
| OVERLAPPING ORDER | 1 | 2 | 3 | 4 |

FIG. 4

| DISCRIMINATER | A | B | C | D |
|---|---|---|---|---|
| VALIDITY INFORMATION | 1 | 1 | 1 | 1 |

FIG. 5
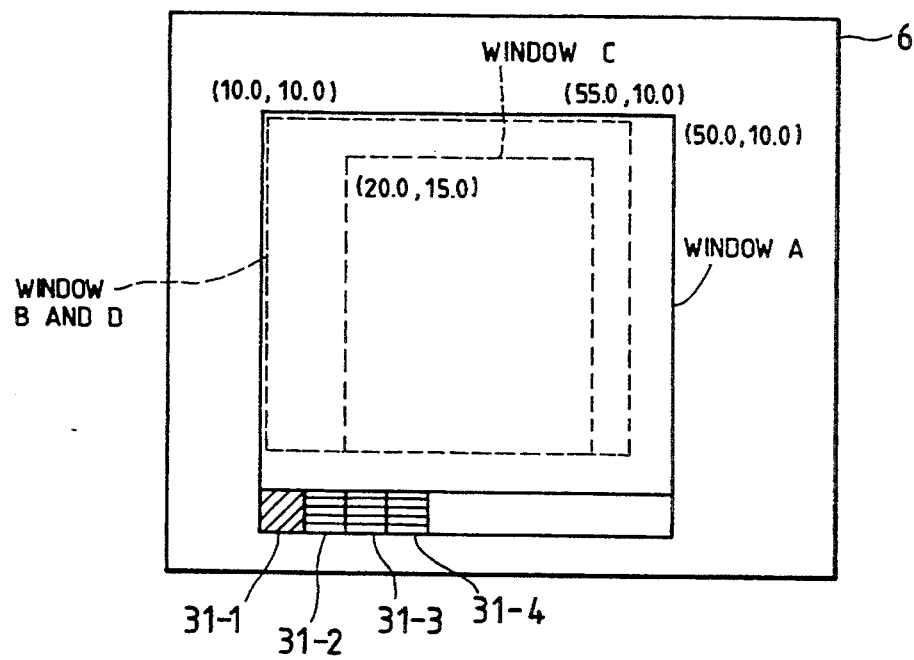
FIG. 6
| DISCRIMINATER | A | B | C | D |
|---|---|---|---|---|
| VALIDITY INFORMATION | 0 | 0 | 0 | 1 |
FIG. 7
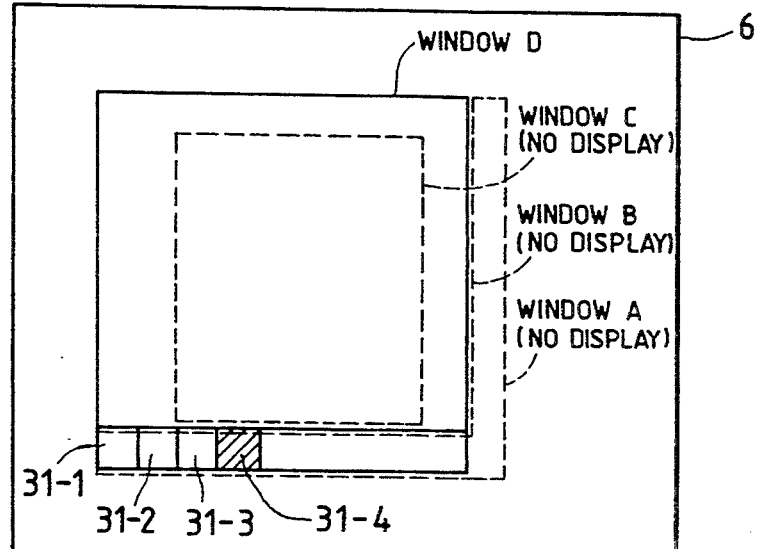

FIG. 14
| ICON \ OBJECT | OVERWRITING INFORMATION | DISPLAY INFORMATION |
|---|---|---|
| ERASER ICON | VALID | INVALID |
| SANDERASER ICON | VALID | VALID |
FIG. 16(a)
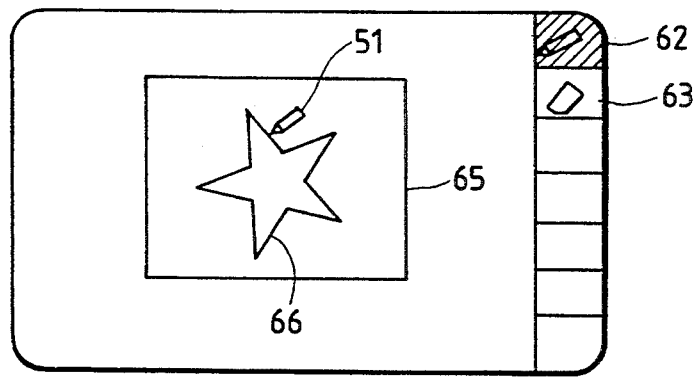
FIG. 16(b)
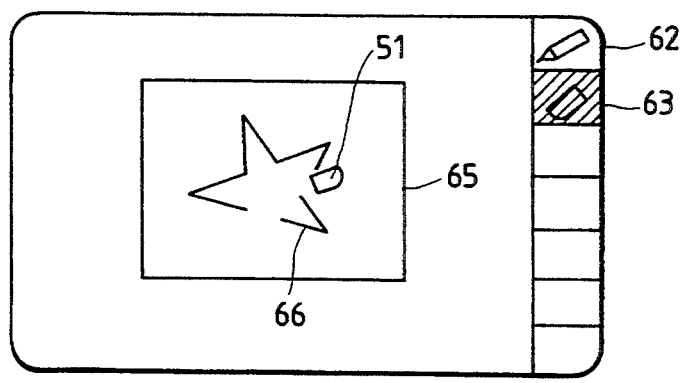

FIG. 18
REGISTRATION OF SEAL IMPRESSION
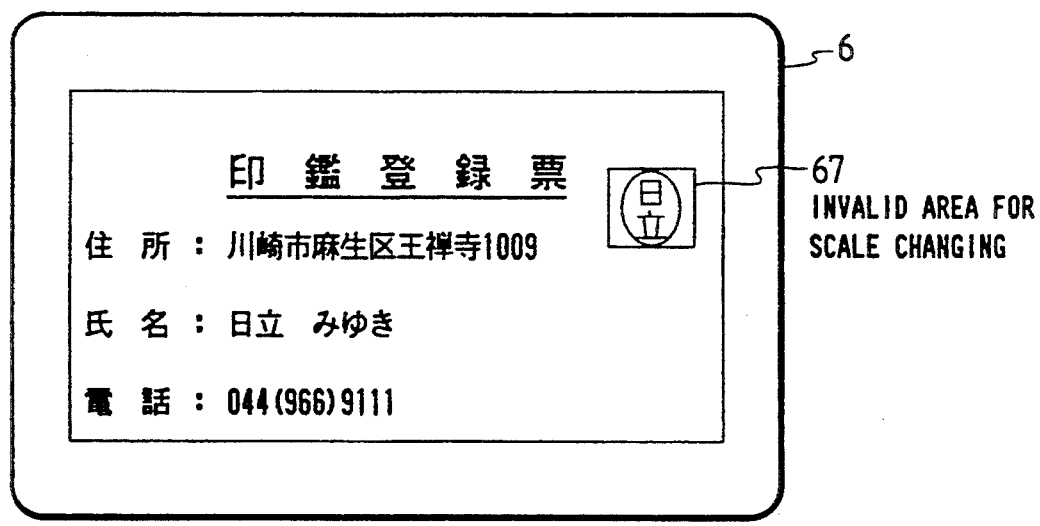
INVALID AREA FOR SCALE CHANGING
DISIGNATION OF SCALE CHANGING
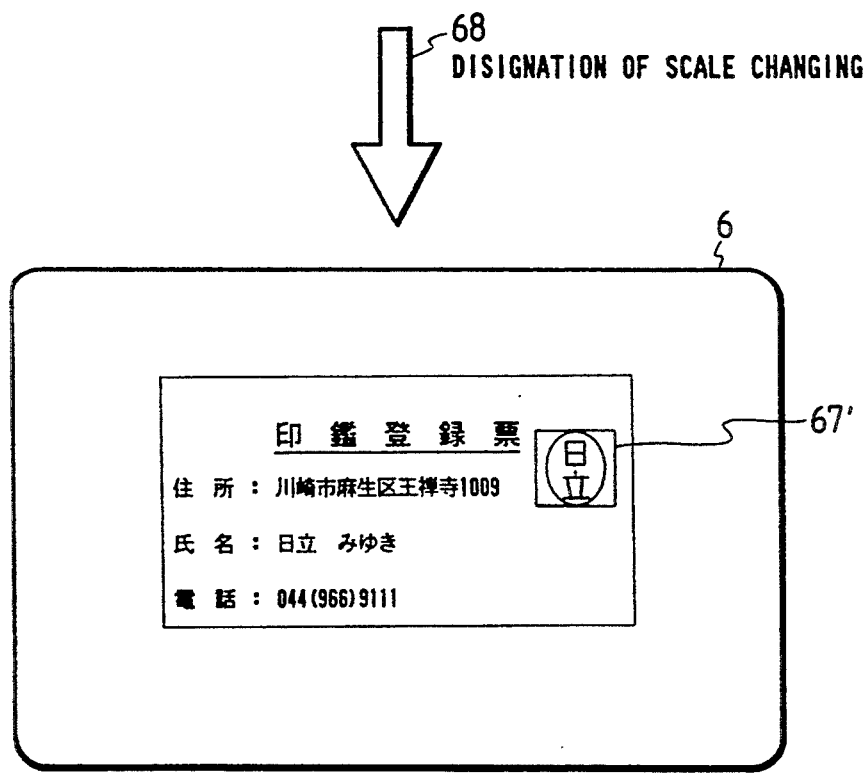

FIG. 19
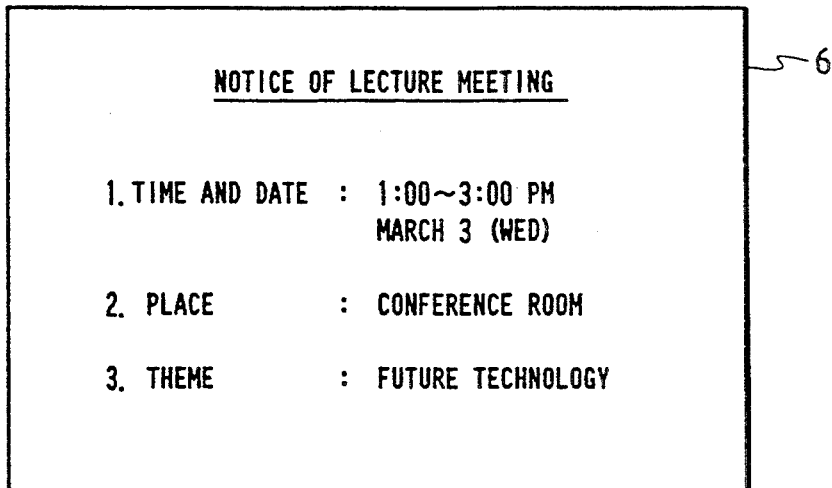
(a)
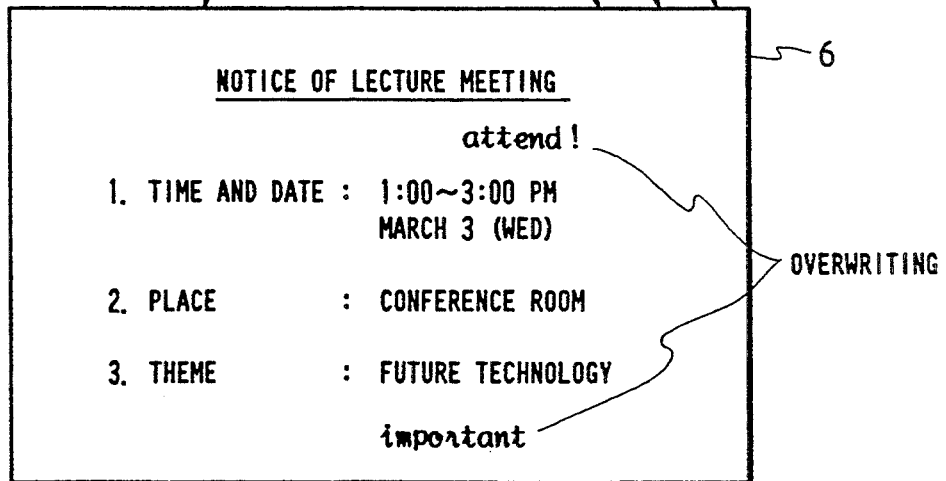
(b)
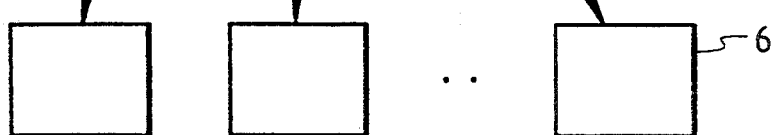

OVERWRITING

DISPLAY CONTROL METHOD AND APPARATUS DETERMINING CORRESPONDING VALIDITY OF WINDOWS OR OPERATIONS

This is a continuation of application Ser. No. 07/336,069 filed on Apr. 11, 1989, now abandoned.

BACKGROUND OF THE INVENTION

The present invention relates to a screen display method and apparatus, more particularly, to a method of displaying a piece of information desired by a user clearly on a screen.

The technique for displaying the desired information clearly according to the prior art is exemplified by Japanese Patent Laid-Open Nos. 59-102284/1984 and 62-39978/1987.

The former Laid-Open No.59-102284/1984 discloses a method of dividing a displayable area of a partial screen into a plurality of rectangular regions in accordance with a predetermined rule to administer the whole display screen as the sum of such rectangular regions.

The latter Laid-Open No. 62-39978/1987 discloses a method of calculating an overlapped visible area, responsive to the overlapping order of a plurality of windows displayed on the screen to make again only that area into a bit map.

SUMMARY OF THE INVENTION

An object of the present invention is to provide a method of and an apparatus for displaying a piece of desired information clearly.

Another object of the present invention is to provide a method of and an apparatus for displaying a piece of desired information on the multi-window controlled screen of a display apparatus such that it may not be covered with another screen.

Still another object of the present invention is to provide a method capable of indicating validity of the display of each piece of partial information on the screen.

Other objects of the present invention will become apparent from the following description taken with reference to the accompanying drawings.

In the multi-window display system, the individual windows can be displayed in an arbitrary positional relation in a partially or wholly overlapped manner. As the number of windows increases, however, some window falls at the back of the fore one so that it cannot be partially or wholly seen. In order for the user to look at such hidden window, the following methods are conceivable:

(1) The operation of moving the foremost window to the back is repeated by making use of the "turnover" function until the desired window comes to the front.

(2) The operation of reducing the size of the fore windows and the operation of moving the desired window to the front are executed.

Brief considerations are made upon these methods.

Let the case be considered in which four windows A, B, C and D are overlapped from the front to the back in the recited order. In this case, it is assumed that the user should desire the whole area of the window C. If the method (1) is executed, the windows are overlapped in the order of C, D, A and B. If the method (2) is executed, on the other hand, the windows are overlapped in the order of C, A, B and D. According to either method, the overlapping order of the windows is changed. If the user then desires the previously foremost window (i.e., A), he has to search for that foremost window by using again the method (1) or (2) although he himself knows that the window A has been in the foremost position.

Having taken the considerations thus far described, the present invention achieves the above-specified objects by the following manner.

A piece of display validity information indicating the validity or invalidity of the display of each window is stored. Each window is controlled to be displayed or not responsive to the display validity information thereof.

This control is realized by developing a data corresponding to each window as a bit map on a bit map memory by using the information of the overlapping order of each window and the information of the display validity. For a window in which the display validity information is not indicated, there is prepared a bit map similar to that of the case in which the window is absent.

Thus, the desired window can be displayed while its overlapping order is left as it is. Moreover, some window can be temporarily undisplayed. As a result, it is possible to provide the multi-window display system, in which the point of view of the user is as if it were moved to the window he designated, thereby improving the operability.

In the description thus far made, the unit of the information is each window of the multi-window controlled screen. Despite this description, the unit the user desires to display or not is not limited to the described case but may be extended to the following case.

There comes into current use a system which is equipped with the display, such as a word processor or a personal computer. This word processor or personal computer is becoming able to be used as if a memorandum or document were written with a pencil or pen.

For the system such as the word processor or personal computer, however, it is difficult to add a memorandum to a document without any change in the content of the original document. It is also difficult to overwrite a mark or note on the document and to delete the overwritten portion when necessary. In other words, it is difficult to write in pencil in a printed document and to delete the written portion with an eraser when necessary.

Thus, the unit of the aforementioned information is made to correspond as letters or drawings on the screen to the above-specified difficulties. This method is basically similar to the aforementioned case of the multi-window controlled screen, as will be described in the following.

A piece of display validity information indicating the validity or invalidity of the display of the displayed letter or drawing for a specific operation is stored. Responsive to this display validity information, the screen display information corresponding to the specific operation is controlled. In a documentation system, an overwriting operation is allowed for a unrewritable document, responsive to a piece of rewrite attribute information indicating whether or not the rewriting operation to delete, change, move, enlarge or reduce the document inputted is to be allowed. Incidentally, the rewrite attribute information corresponds to the aforementioned display validity information.

Thus, if the display validity information added to the displayed letter or drawing is "valid", the specific operation is accomplished for that letter or drawing. If "invalid", the specific operation is not accomplished for that letter or drawing. Even if the whole screen is deleted as the specific operation, the letters and drawings are partially deleted and partially not so that a function to separately write with the pencil and pen can be provided.

In case, moreover, the original document is overwritten, an overwrite document is provided separately from the original document. In the overwriting case, the overwrite document is subjected to an edition, and the original document is displayed as the background so that a usable overwriting function can be provided.

BRIEF DESCRIPTION OF THE DRAWINGS

FIG. 2 is a diagram showing the structure of a window control information area;

FIG. 3 is a diagram showing the structure of an overlapping order area;

FIGS. 4 and 6 are diagrams showing the structures of a validity information area;

FIGS. 5 and 7 are diagrams showing examples of a multi-window controlled display;

FIG. 14 is a diagram showing the structure of the validity information area of the second embodiment;

FIGS. 16(a) to 30(b) are diagrams showing modifications of the second embodiment of the present invention; and FIGS. 21(a) to 21(d) and 23 are diagrams showing an application of the second embodiment of the present invention, and FIG. 22 is a flow chart showing the operations thereof.

DETAILED DESCRIPTION OF THE PREFERRED EMBODIMENTS

The present invention will be described in detail in the following in connection with the embodiments thereof with reference to the accompanying drawings.

Figure 1:
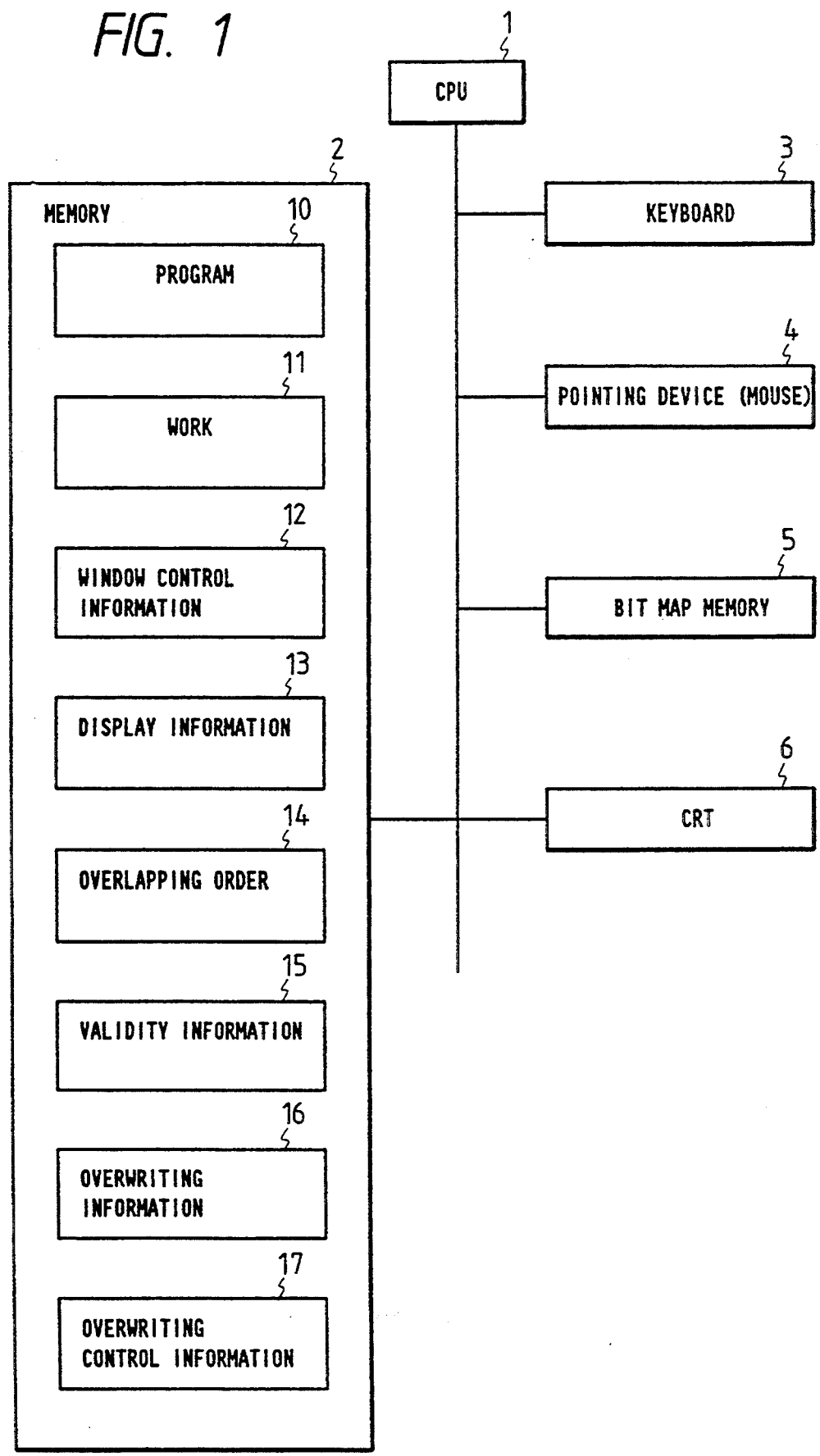
FIG. 1 is a block diagram showing one embodiment of the structure of a system according to the present invention.

The structure of a system for exemplifying the present invention will be described with reference to FIG. 1. Reference numeral 1 designates a CPU (i.e., Central Processing Unit). Numeral 2 designates a memory. Numeral 3 designates a keyboard. Numeral 4 designates a pointing device, which may be called the "mouse". Numeral 5 designates a bit map memory for storing a bit map data to be displayed in a CRT (i.e., Cathode Ray Tube) 6.

As will be apparent from the above-specified components, the system, to which the present invention is applied, may be an ordinary computer system. This computer system may be a large-scale computer system having many terminals at the components 3, 4, 5 and 6 enumerated above, and the CPU 1 and the memory 2 may be distributed in the host computer. The computer system may be those called the "personal computer" or the "work station". The computer system may also be a documentation system such as the word processor.

The memory 2 is divided into the following areas when it is used. Reference numeral 10 designates a storage area for storing a program to be executed in the present system. Numeral 11 designates a work area necessary for executing the program. Numeral 12 designates a storage area for storing a piece of window control information in case the display screen of the CRT 6 is multi-window controlled. Numeral 13 designates a display information file to be outputted to the CRT 6. In the case of the multi-window controlled display, the display information file 13 is stored responsive to each of the multiple windows. Numeral 14 designates an area for storing the overlapping order of the multi-windows. Numeral 15 designates an area for storing the validity information of the display. This validity information area 15 stores both the validity information corresponding to each information in the case of the multi-window controlled display and the validity information corresponding to the characters and illustrations of one or single window. Numeral 16 designates an area for storing a piece of overwriting information on some displayed information. Numeral 17 designates an area for storing a piece of overwriting control information when a piece of overwriting information is to be overwritten.

FIG. 2 is a diagram showing a specific example of the structure of the window control information area 12. FIG. 2 illustrates the overlapping of windows A, B, C and D. FIG. 3 is a diagram showing a specific example of the structure of the overlapping order area 14. FIG. 3 illustrates the overlapping of the four windows shown in FIG. 2 in the order of A, B, C and D from the front to the back. On the other hand, FIG. 4 is a diagram showing an example of the structure of the validity information area 15 in the case of the multi-window controlled display. The value "1" of the validity information indicates the display (or validity), whereas the value "0" indicates the non-display (or invalidity). Here, FIG. 5 illustrates an initial state displaying all the windows.

FIG. 5 shows an example of the display of the multi-window screen which is displayed using the pieces of area information of FIGS. 2 to 4. In FIG. 5, the window A is displayed, and the individual 10 windows B, C and D are overlapped so that they are unseen.

In the present embodiment, all the windows (no matter whether they might be displayed or not) existing in the screen are displayed as icons below the window (A) displayed in the foremost. In the example of FIG. 5, reference numeral 31-1 designates the existence of the window A, and numerals 31-2, 31-3 and 31-4 designate the existences of the windows B, C and D, respectively. Here: the hatched square indicates the foremost window; the squares with horizontal lines indicate the remaining display windows; and the squares without any line indicate the non-display windows (which are not shown in FIG. 5).

A method of transferring the display state of FIG. 5 to the view point upon the window D, namely, a method of displaying the window D as if it came to the foremost will be briefly described in the following. Although the detail will be made hereinafter, the description is based upon the operation order of the user so as to make the summary of the operations of the embodiment understandable.

The user picks the numeral 31-4 of the icon display with the pointing device 4. With this pick, however, the window control information 12 shown in FIG. 2 and the overlapping order 14 shown in FIG. 3 remain unchanged. On the contrary, the validity information 15 shown in FIG. 4 is changed, as shown in FIG. 6. Specifically, the whole validity information relating to the window of higher overlapping order than that of the window (D) designated, the display screen is changed to that shown in FIG. 7, as if the view point were moved to the depth of the window D.

The following description is directed to the case in which the screen before the above-specified operations, i.e., the window A is to be observed.

The window D shown in FIG. 7 has the fourth overlapping order but can be observed in its entirety because the windows A, B and C are undisplayed. In FIG. 7, numerals 31-1 to 31-4 designate the aforementioned window icons, of which the icons 31-1 to 31-3 are displayed without any line, indicating that the all the first, second and third windows A, B and C are undisplayed. Here, in order to make the previously seen window A observable, the window icon 31-1 is picked with the pointing device 4. Then, the validity information 15 restores the area shown in FIG. 4 so that the display screen is returned to that shown in FIG. 5.

Although the operations have been summarized, detailed descriptions will be made in the following with reference to FIGS. 2 to 4.

The area of the window control information 12 of FIG. 2 is composed of the following areas in connection with each of the multi-windows. In FIG. 2, the area of the discriminator of each window is stored with the windows A, B, C and D. In the areas of position X and position Y, the coordinates of the lefthand upper corner of each window are designated. The origin of the coordinates is located at the lefthand upper position of the displayable area of the CRT 6. Since the window A has the position X at 10.0 and the position Y at 10.0, its lefthand upper coordinates are (10.0, 10.0). The windows B, C and D are likewise designated. The size X indicates the length taken in the X-axis direction from the lefthand upper corner of each window. The size Y indicates the length taken in the Y-axis direction from the lefthand upper corner of each window. The diagram indicates that the window A has a size of 50.0 in the X-axis direction and 45.0 in the Y-axis direction from the coordinates (10.0, 10.0). Similar indications can be made for the windows B, C and D. Next, the content of the icon (X, Y) indicates the position and size of the icon corresponding to each window. The upper values indicate the X-coordinates, and the lower values indicate the Y-coordinates. Specific descriptions will be made on the window A. The upper value of 12.5±2.5 implies that the icon corresponding to the window A is an area having a center X-coordinate of 12.5 and lengths of 2.5 in the forward and backward directions on the X-axis. The Y-coordinate is specified by 57.5±2.5. This implies that the icon is an area having a center Y-coordinate of 57.5 and lengths of 2.5 in the forward and backward directions on the Y-axis. In other words, the icon corresponding to the window A is an area having center coordinates (12.5, 57.5) and a length of 5.0 in the X- and Y-axis directions. Like indications can be made on the windows B, C and D.

The areas of the overlapping order of FIG. 3 are stored with the overlapping orders corresponding to the respective discriminators of the windows. FIG. 3 illustrates that the windows are in the order of A, B, C and D from the foremost.

The areas of the overlapping order 15 of FIG. 4 indicate validity of the respective displays of the windows corresponding to the discriminators of the windows. It is assumed that, if the value indicating the validity is 1, the display of the corresponding window is effective. If the value is 0, the corresponding indication is assumed to be ineffective. FIG. 4 illustrates that all the windows A, B, C and D are valid. As is now apparent from the descriptions thus far made with reference to FIGS. 2 to 4, the display data is made into the bit map memory 5 in accordance with the content shown in FIGS. 2 to 4 and displayed in the CRT 6, as shown in FIG. 5.

The operations of the present embodiment will be described in detail in the following with reference to the flow chart shown in FIG. 8. The description of the flow chart shown in FIG. 8 will be made at first, followed by that of a specific example.

Figure 8:
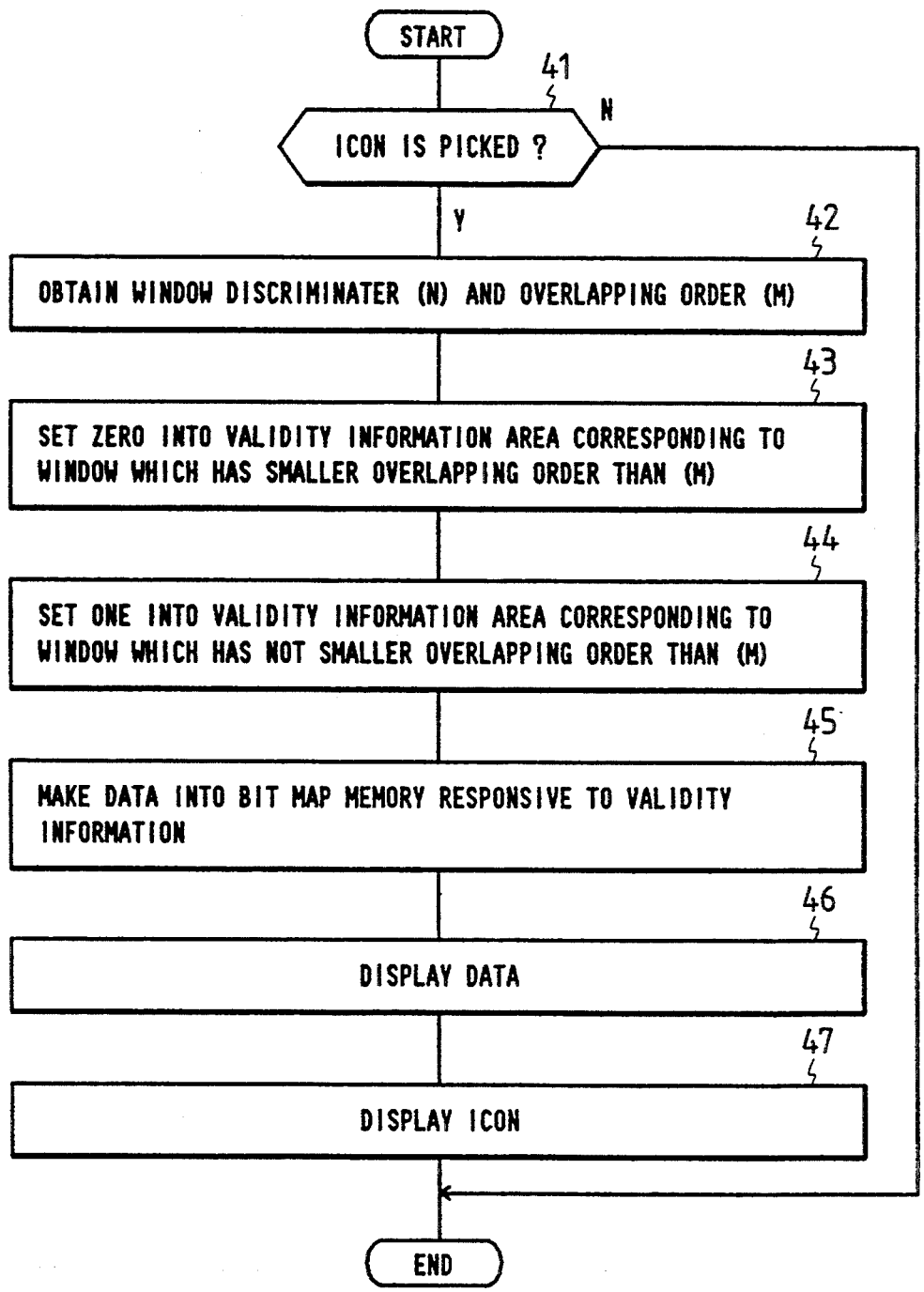
FIG. 8 is a flow chart showing the operations of a first embodiment of the present invention.

The processing shown in FIG. 8 is substantially started when the icon is picked (at Step 41). If the icon is picked by the pointing device 4, the coordinates of the picked position are read in. With reference to the areas of the window control information 12 and the overlapping order 14, the discriminator N and an overlapping order M of the window corresponding to the read coordinates are obtained (at Step 42). The value of 0 is set (at Step 43) into the validity information area 15 corresponding to the window which has a smaller order than the overlapping order M obtained. The value 1 is set (at Step 44) into the validity information area 15 corresponding to the window which has not a smaller order than the overlapping order M. The display information 13 is made (at Step 45) into the bit map memory 5, responsive to the validity information area 15. The content of the bit map memory 5 is displayed (at Step 46) in the CRT 6. The icons are then displayed (at Step 47) in the CRT 6, responsive to the content of the validity information area 15. Thus, a series of processing procedures are ended.

The operations thus far described will be described again with reference to the flow chart of FIG. 8.

Let it be first assumed that the icon 31-4 corresponding to the window D of FIG. 5 be picked (at the Step 41). It is recognized responsive to the values of the icon (X, Y) of the area of the window control information 12 shown in FIG. 2 that the picked coordinates values of the icon 31-4 correspond to the window D. In other words, it is recognized that the value N specified by the step 42 of FIG. 8 is at D. On the basis of the recognition of the window D, responsive to the area of the overlapping order 14 shown in FIG. 3, it is obtained (at the Step 43) that the corresponding overlapping order, i.e., M is at 4. Since M is 4, the value 0 is set (at the Step 43) into the corresponding values of the validity information area 15 of the windows A, B and C having a smaller overlapping order than 4. The value 1 is set (at the Step 44) into the value of the validity information area 15 of the window D having a smaller overlapping order than 4. The results of the Steps 43 and 44 are illustrated in FIG. 6. Responsive to the validity information shown in FIG. 6, the display data of the individual windows in the area of the display information 13 are made (at the Step 45) into the bit map memory 5, and their contents are displayed (at the Step 46) in the CRT 6. Finally, the icons are displayed responsive to the validity information 15 shown in FIG. 6. Since the windows A, B and C are undisplayed, the individual icons 31-1, 31-2 and 31-3 of FIG. 7 are blanked. Since the window D is displayed, the corresponding icon 31-4 is hatched (at the Step 47). This icon displaying method may be made more recognizable with colors or brightnesses.

Figure 9:
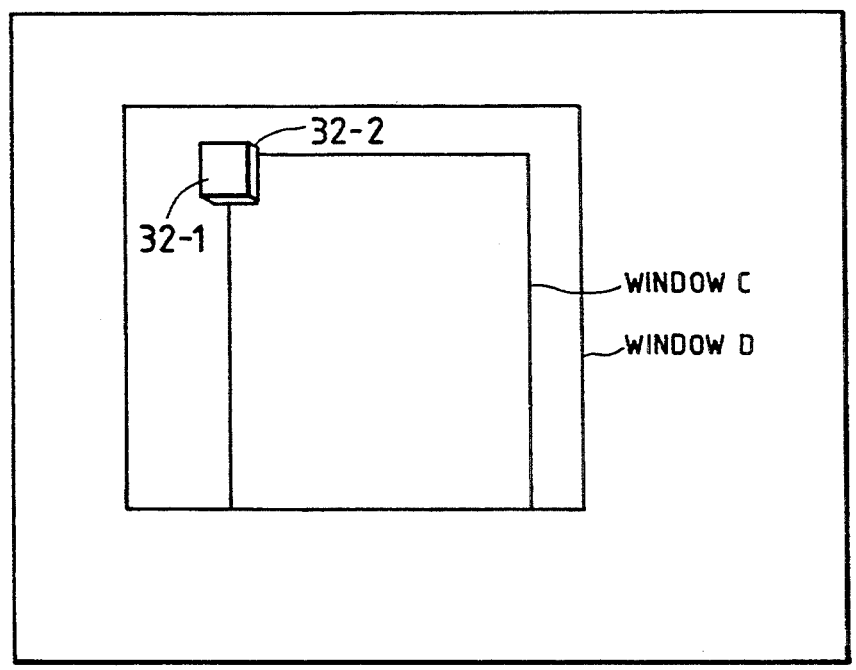
FIGS. 9 and 10 are display screens for illustrating a modification of the first embodiment of the present invention.
Figure 10:
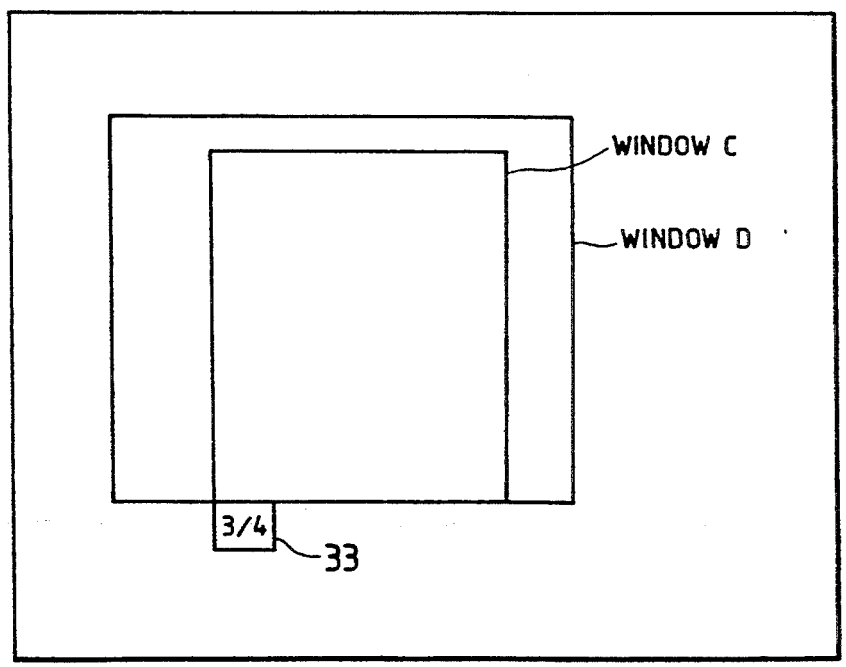

The embodiment thus far described is exemplified by displaying all the windows (displayed or undisplayed), that exist in the screen, in the form of icons below the window displayed in the foremost. The display method should not be limited to the aforementioned one but may be exemplified, as follows, by displaying only the undisplayed windows in the form of the icons (e.g., 32-1 and 32-2 in FIG. 9) or by indicating the number (e.g., 33 in FIG. 10) of existence of the windows. Here in the display method of FIG. 10, the denominator of the displayed fraction indicates the number of the existing windows, and the numerator indicates the overlapping order of the foremost window. It is needless to say that the display position may be located in a window other than the foremost one or in the upper or lower portion of the screen.

On the other hand, the foregoing embodiment is exemplified by picking the icon with the pointing device 4 according to the window indicating method of the user. However, another method may be accomplished by moving the view point one by one forward or backward each time the picking device 4 is clicked or by inputting a command from the keyboard 3. It is also needless to say that an application program may be prepared for use.

FIGS. 11(a) to 11(e) shows an application of the embodiment thus far described. In this application: a first window displays a table of data for analysis; a second window displays data of an analysis method; a third window displays a graph of the analyzed result; and a fourth window displays a history of the analysis till now. It is assumed that these windows be overlapped in the first to fourth order and that the icons corresponding to the windows are arranged in the first to fourth order from the lefthand side of the drawing.

Figure 11A:
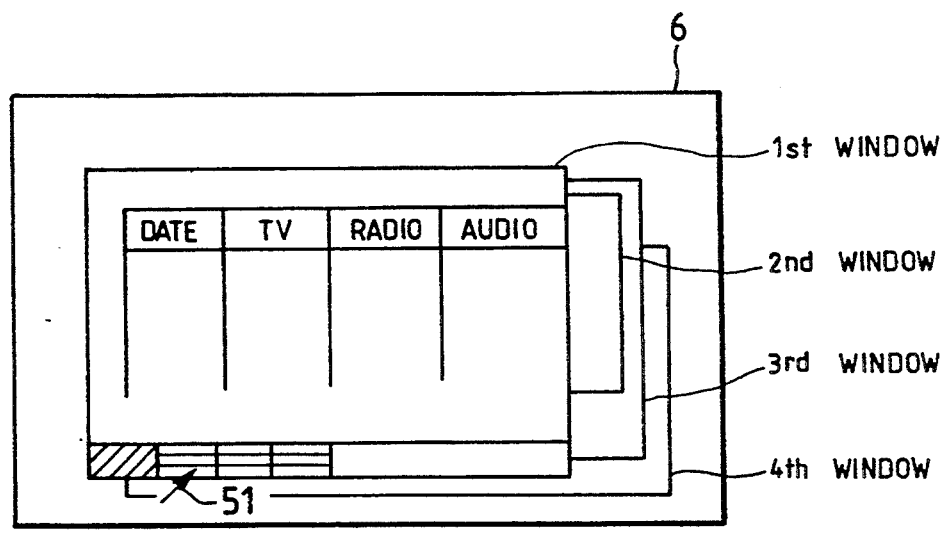
FIGS. 11(a) to 11(e) and FIGS. 12(a) to 12(d) are diagrams for illustrating applications using the embodiment of the present invention.

The user is assumed to analyze the table data (as shown in FIG. 11(a)) with the exponential smoothing method for analyzing the first window. In order to use the second window, the icon corresponding to the second window is picked. Specifically, the icon is picked by moving the shown cursor 51 to a desired icon position and then by clicking the button of the pointing device 4. As a result, the view point of the user is brought to the second window (as shown in FIG. 11(b)).

Figure 11B:
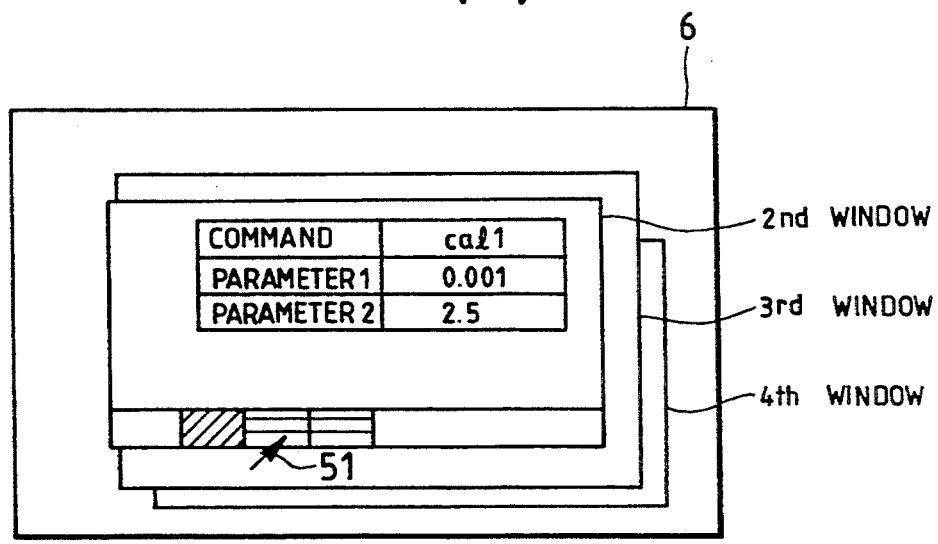
Figure 11C:
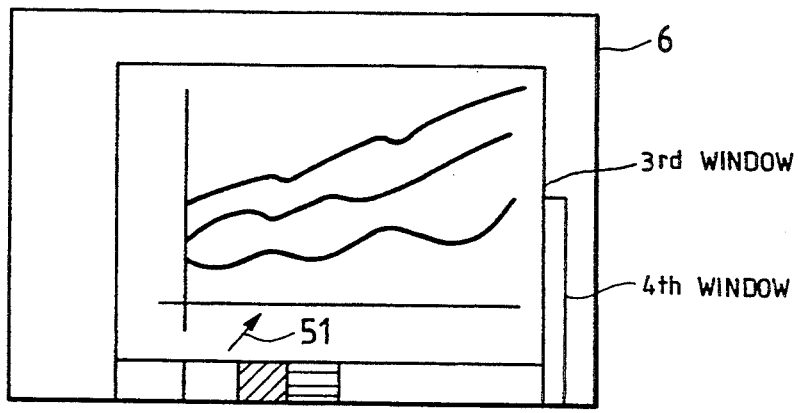
Figure 11D:
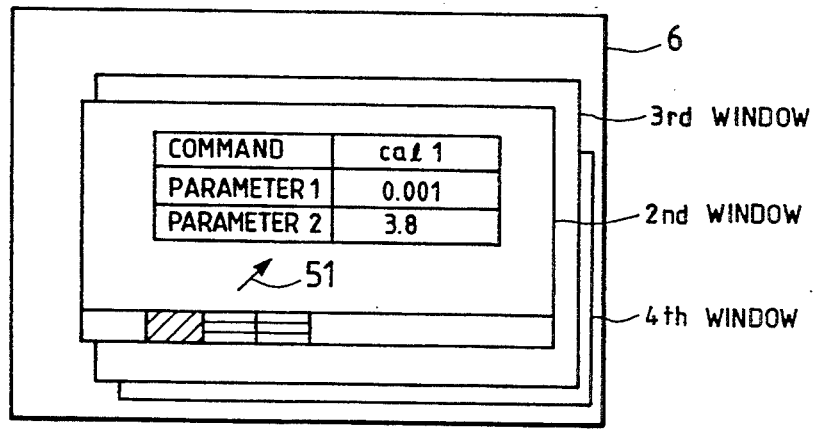
Figure 11E:
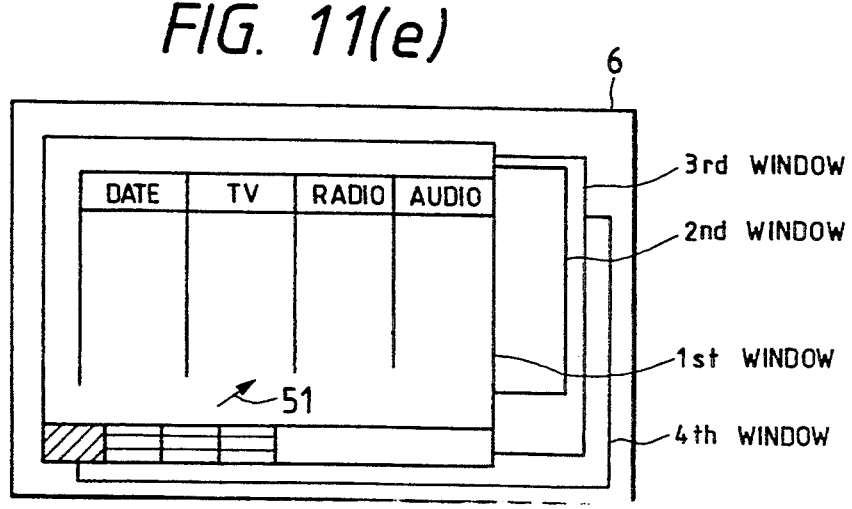

Next, the command and parameters of the exponential smoothing method are inputted by the user, as shown in FIG. 11(b), to execute the predetermined processing. If the icon corresponding to the third window is picked to see the inputted results, the view point is turned to the third window (as shown in FIG. 11(c)). In view of the state of the graph displayed in FIG. 11(c), the window may be switched to another in the following manner. In case the parameter is to be partially changed, the icon corresponding to the second window is picked. In case, on the other hand, the analysis method is to be changed once more in view of the table data, the icon corresponding to the first window is picked. Then, the view point is brought to the second window (as shown in FIG. 11(d)) or the first window (as shown in FIG. 11(e)). Here, the cursor 51 is omitted from FIGS. 11(c) to 11(e).

Thus, the user is enabled to change the associated windows easily. Here, let it be considered the method of repeating the operations to move the foremost window to the back by making use of the "turn-over" function until the desired window comes to the foremost. In case the processing is to be accomplished by changing the desired windows many times, as shown in FIGS. 11(a) to 11(e), the front and rear relations of the windows are lost making it necessary to search the desired window upon each change of the windows. On the other hand, according to the method of the present embodiment if the icon corresponding to the desired window is picked, its front (having higher overlapping orders) windows are all undisplayed so that the multi-windows can be handled as if the view point were moved while leaving them in the same overlapped order.

Additionally, in the method making use of the "turn-over" function the windows have to be small-sized and arranged with a small displacement so as to the desired one may be brought to the foremost by the pointing device or the like. On the other hand, according to the method of the present embodiment the desired window can be observed through the visual display (of the microcomputer) of the existence of the windows so that the window can be formed to the full size of the display screen of the CRT 6. Thus, there can be attained an effect so the multi-windows are made easily observable and usable.

The embodiment described above is directed to the case, in which the validity information in a higher or lower overlapping order than the window designated by the user is dynamically undisplayed. Despite this disclosure, however, one feature of the present invention is to make a specific window temporarily undisplayed. An embodiment in this case will be described in the following with reference to FIGS. 12(a) to 12(d).

Figure 12A:
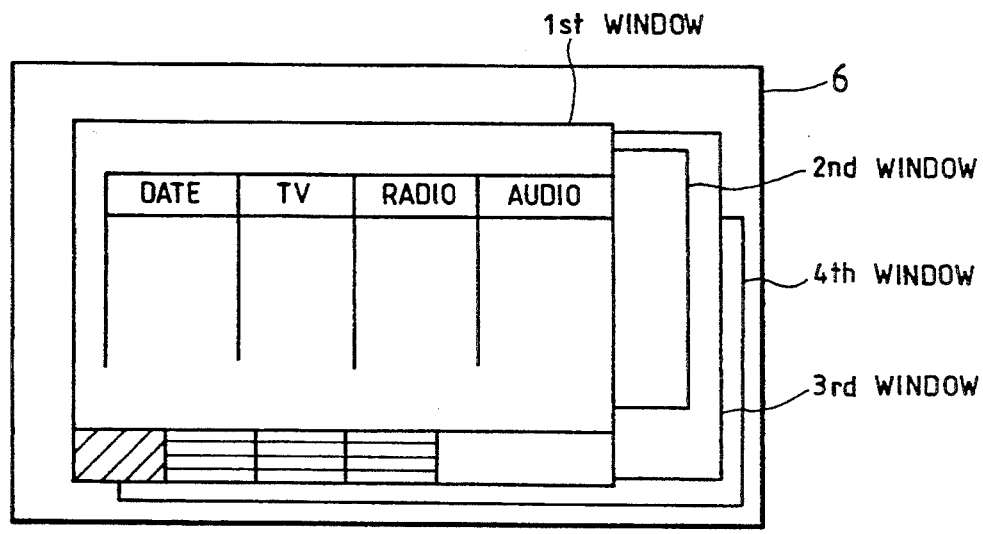

In FIG. 12(a), like FIGS. 11(a) to 11(e): the first window displays the table data for analysis; the second window displays the data of the analyzing method; the third window displays the analyzed results; and the fourth window displays the history of the analysis till now. The display order of the microcomputer is similar to that of FIGS. 11(a) to 11(e). The table data is sequentially changed and analyzed by the analyzing method fixed so that graphs illustrating the results are sequentially displayed. In this case, clear observations are obstructed if the window of the analyzing method (i.e., the second window) and the window of the analytical history (i.e., the fourth window) are displayed. Therefore, the pieces of validity information corresponding to the second and fourth windows are set at the value "0" (or undisplayed). As a result, the display is, as shown in FIG. 12(b).

Figure 12B:
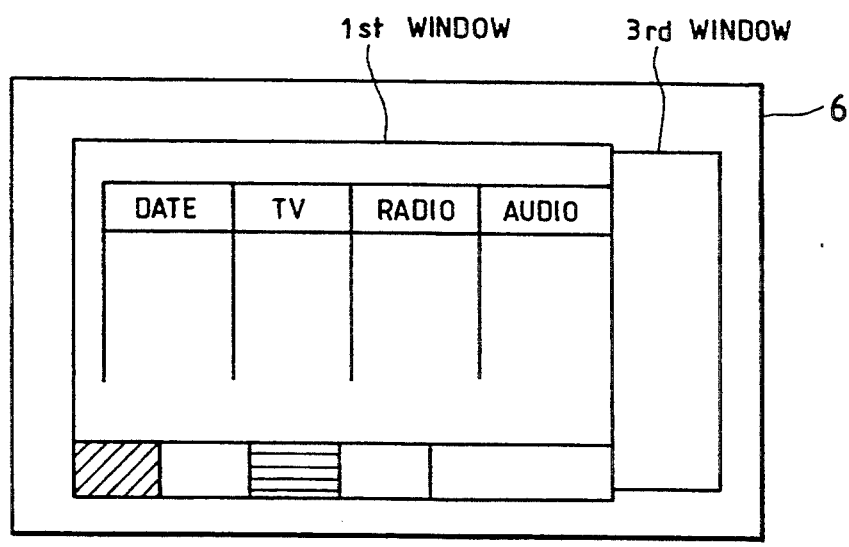
Figure 12C:
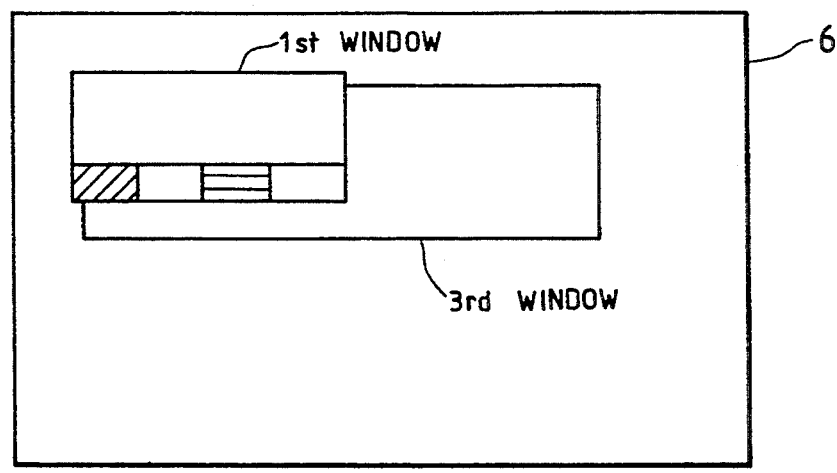
Figure 12D:
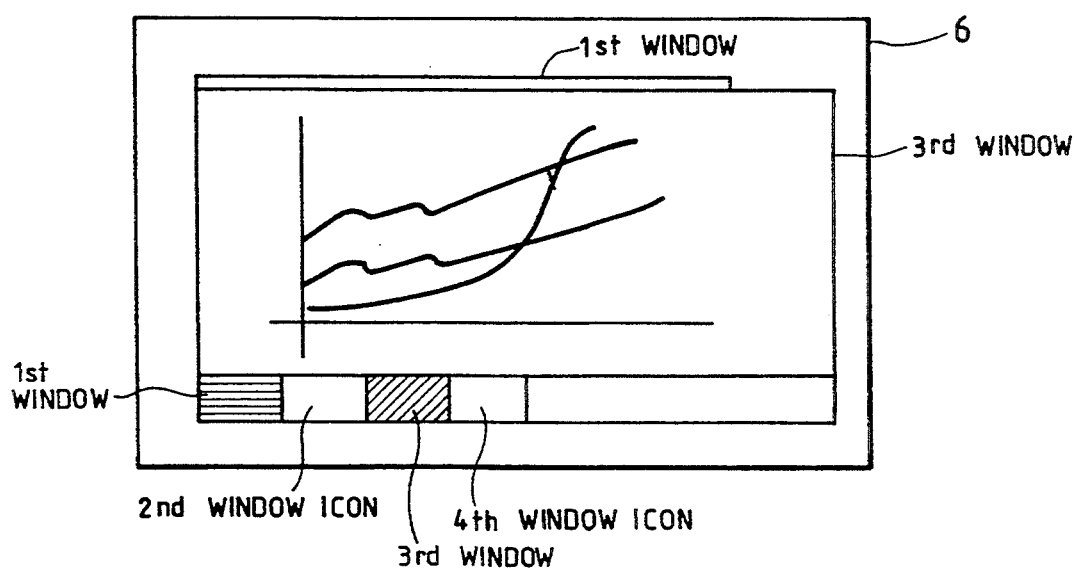

In FIG. 12(b), as compared with FIG. 12(a), the state of the display of the window icon is changed, and the second and third windows are not displayed. As a result, even if the window is small-sized, as shown in FIG. 12(c) or if the overlapping order of the windows is changed by making use of the "turn-over" function, as shown in FIG. 12(d), the unnecessary windows are not displayed leaving the second and fourth windows undisplayed.

In case, in the course of the series operations, a special request is made, it is possible to change the analyzing method data or to examine the analytical history, as before, if the value of the validity information is changed to "1" (i.e., display). Thus, according to the present embodiment, the unnecessary windows can be temporarily undisplayed to widen the usable range of the multi-windows.

Incidentally, the change in the content of the aforementioned display validity information may be exemplified, as described hereinbefore, by picking the aforementioned window icons with the pointing device from the "display" to the "non-display", by inputting the change command from the keyboard or by preparing the application program.

Since, according to the present embodiment, the window, if unnecessary, on the multi-window controlled screen can be left undisplayed, the observability of the display screen can be improved. Moreover, the operations for displaying or not displaying each window can be simplified to enhance the operability. Since, furthermore, a desired window can be observed without any change in the display position of each window, it is possible to provide an excellent human interface from the standpoint of human engineering.

Another embodiment of the present invention will be described in the following. The objectives of display and non-display of the foregoing embodiment were the windows but now the objectives are the display and non-display of letters or drawings in a certain screen or window in the present embodiment.

In order to aid in understanding this embodiment, an application will be described in the following before the detailed description.

FIGS. 13(a) to 13(d) are diagrams showing the application. As shown, the display screens of the CRT 6 of the system have two kinds of write and display functions 61 and 62 and two kinds of delete functions 63 and 64 so that they can accomplish the writing, displaying or deleting operations by operating the keyboard 3 or the pointing device 4 such as the mouse. In the display screen of FIG. 13(a), there are displayed letters or graphs which are written with a pen acting as the first write or display function. Here, the pen is illustrated to show that the letters and graphs displayed in the screen are as if they were inputted with the pen. The reference numeral 61 designates an icon indicating the pen having a first writing or displaying function. If this icon 61 is picked with the mouse 4 to operate the mouse 4 or the keyboard 3, it is possible to write a letter, drawing or segment in the screen. Numeral 62 designates an icon indicating the pencil having a second writing or displaying function and used like the foregoing pen. Like this pen, the pencil 62 can be used by operating the mouse 4 or the keyboard 3 to write a letter, drawing or segment in the screen. The numeral 63 designates an icon indicating an eraser having a first deleting function. If the mouse 4 is operated, the letter, drawing or segment, which were written with the pencil 62 having the second writing or displaying function, can be deleted, but that written with the pen 61 having the first writing or displaying function cannot be deleted. In order to delete the letter, drawing or segment written with the pen 61, the sanderaser (as indicated at the numeral 64) having a second deleting function is used. The sanderaser 64 can delete the letter, drawing or segment which was written with not only the pen 61 but also the pencil 62.

Figure 13B:
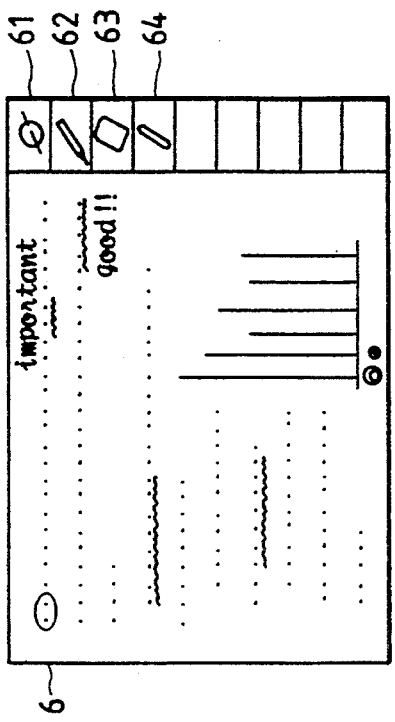
FIGS. 13(a) to 13(d) are display screens based upon a second embodiment of the present invention.
Figure 13D:
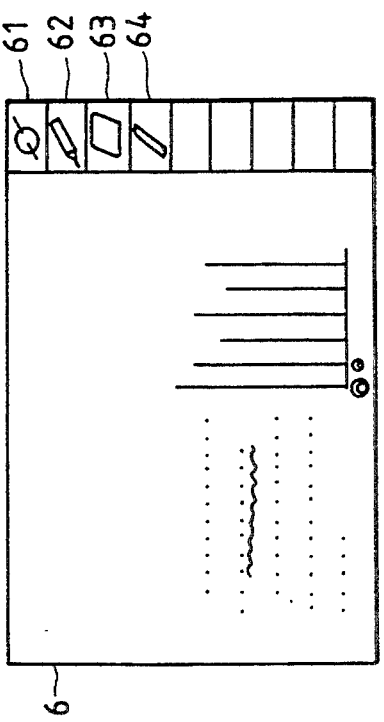
Figure 13A:
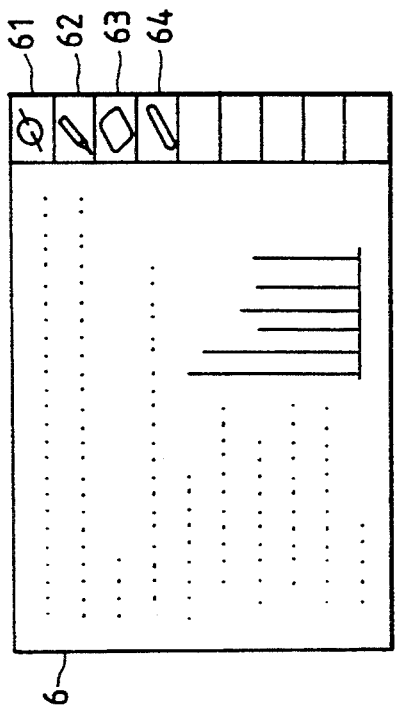

FIG. 13(b) shows the state (as indicated by a circle, an undulating line or a filled portion), in which the user added a note or memorandum with the pencil in the screen of FIG. 13(a). In this example, the letters, drawings or segments corresponding to two kinds of writing or displaying functions are not discriminated in the screen display. Despite this fact, however, the discriminations may be confirmed by changing one line into a broken one, by blinking it or by deleting it temporarily responsive to a command inputted.

Figure 13C:
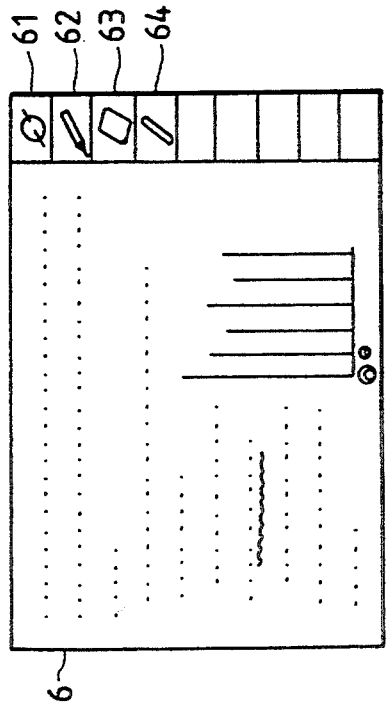

FIG. 13(c) shows the screen of FIG. 13(b) with its upper half being deleted with the eraser 63, and FIG. 13(d) shows the screen of FIG. 13(b) with its upper half being deleted with the sanderaser 64. The eraser 63 is effective only for the document written with the pencil 62 so that the document written with the pen 61 is left as it is. The sanderaser 64 is effective for both the documents so that it can delete the upper half as a whole.

Thus, like the ordinary memorandum with the pencil, the materials can be edited freehand with ease. In this example, the sanderaser 64 is effective for both the documents written with the pen 61 and the pencil 62. In the example thus far described, the system is fixed in the writing or displaying function and in the deleting function, and the content of the validity information designating which deleting function is effective for the writing or displaying function is also fixed. However, it is also possible for the user to change the content freely or to set a new deleting function or a new writing or displaying function.

The blocks of FIG. 1 having important relations to the present embodiment will be described in the following. The reference numeral 16 designates the area for storing the overwriting information such as the document information of the letter or drawing written with the pencil icon 62. The document information of the letter or drawing written with the pen icon 61 is stored in the display information area 13. The numeral 17 designates the overwriting control information area for storing the information administering which documents (or portions) in the overwriting information area 16 and in the display information area 13 correspond to each other. The CPU 1 writes the letter or drawing inputted from the aforementioned keyboard 3 or the mouse 4 in the display information area 13 or the overwriting information area 16; displays the pieces of information in the display information area 13 and in the overwriting information area 16 so that they are displayed in an overlapping manner (through an OR-logic) in the CRT 6 via the bit map memory 5, responsive to the content of the content of the overwriting control information area 17; and deletes or displays the displayed portion partially in accordance with the content of the validity information area 13, responsive to a deleting instruction from the keyboard 3 or the mouse 4. In the present embodiment, the validity information area 13 is indicated by the diagram shown in FIG. 14. In case the eraser icon 63 is selected, as shown, the overwriting information.16 for the pencil is subjected to the deletion. In case the sanderaser icon 64 is selected, both the overwriting information 16 and the display information 13 are subjected to the deletion.

Figure 15:
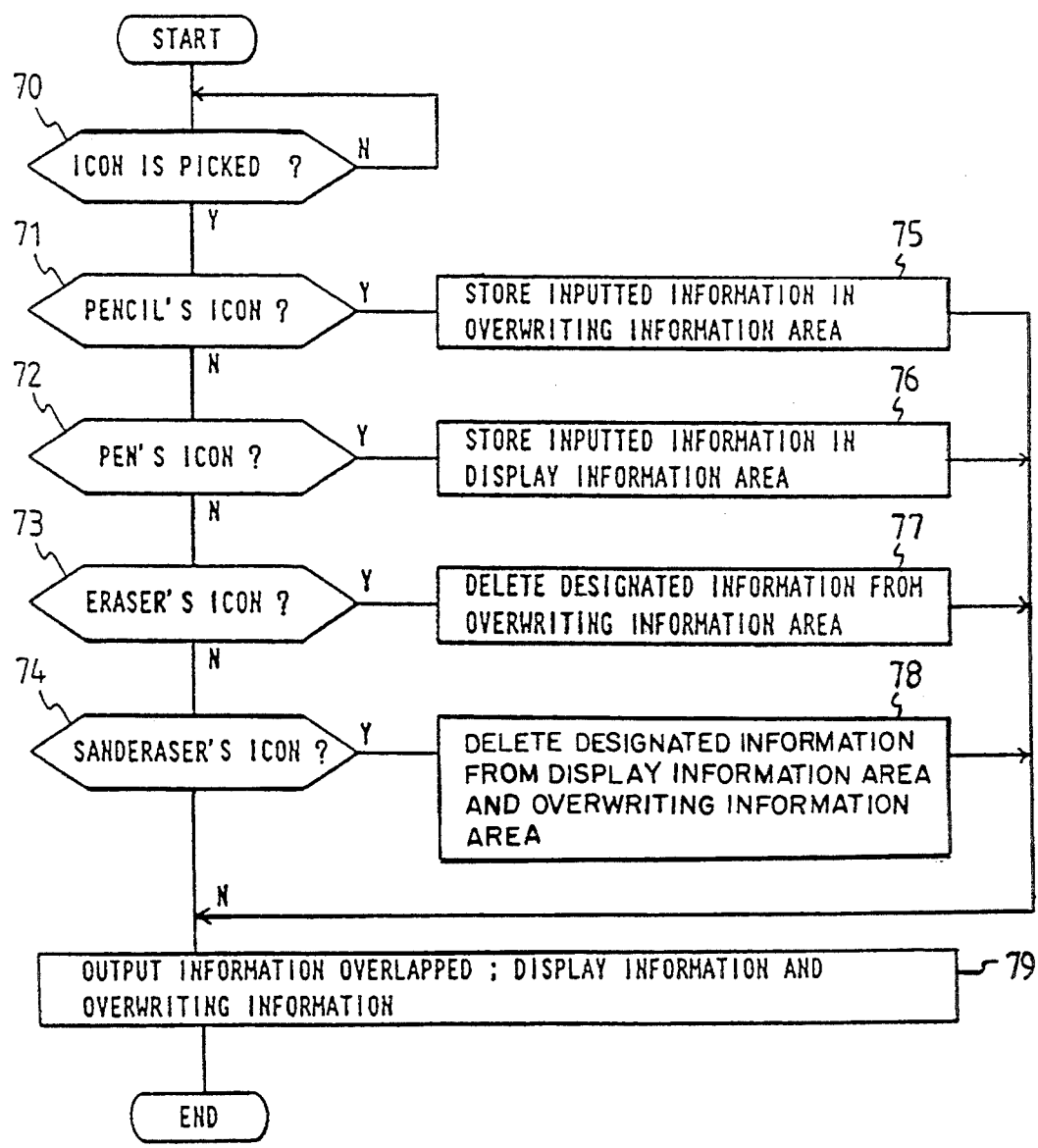
FIG. 15 is a flow chart showing the operations of the second embodiment of the present invention.

FIG. 15 shows a flow chart showing the operations of the present embodiment, as will be described in the following with reference to FIG. 15.

When an icon is picked, the processing is substantially started (at Step 70). Steps 71 to 74 are presented for discriminating which icon was picked. If it is determined at the Step 71 that the pencil icon 62 was picked, a piece of subsequent information inputted is stored (at Step 75) in the overwriting information area 16. If it is determined at the Step 72 that the pen icon 61 was picked, a piece of subsequent information inputted is stored (at Step 76) in the display information area 13. If it is determined at the Step 73 that the eraser icon 63 was picked, the designated information is deleted (at Step 77) from the overwriting information area 16. If it is determined at the Step 74 that the sanderaser icon 64 was picked, the designated information is deleted (at Step 78) from the display information area 13. The pieces of information stored in the display information area 13 and the overwriting information area 16 are outputted (at Step 79) to the bit map memory 5 with reference to the information of the overwriting control information area 17 so that the overlapped screens are outputted to the CRT 6.

Incidentally, in the embodiment described above, the pieces of document information such as the overwriting information and the display information are held separately of each other for their writing and displaying functions. The embodiment has the validity information indicating whether or not each area is valid for the deleting function such as the eraser or the sanderaser; and the overwriting control information indicating the correspondance between the overwriting information and the display information. The structure should not be limited to the above, but the embodiment may hold three pieces of information: the document information to be stored: a piece of attributive information indicating what content of the stored information is written by each function; and the information indicating the relation between the operation and the attribute whether or not one document (or attribute) is valid for one operation (to use the eraser).

In the embodiment thus far described, each of the two kinds of writing or displaying functions has the validity or invalidity information of the erasing means. However, not the plural but one writing or displaying function may give each letter, drawing or pixel the validity or invalidity information of the deleting function, as will be specified in the following.

FIGS. 16(a) and 16(b) show an example of the case in which one drawing is to be formed in the screen of the CRT 6 by the method of trial and error. In case one drawing is to be formed, its portion "B" is frequently determined in view of the balance with another portion "A" which is already completed. In the example of FIGS. 16(a) and 16(b), a square 65 corresponds to the portion "A" whereas a star 66 corresponds to the portion "B". The star 66 may have to be deleted many times with the eraser and rewritten with the pencil 62, as shown in FIG. 16(b), considering the balance (i.e., the positional relation) with the square 65. In this case, the square 65 may be partially deleted when the star 66 is deleted.

.Therefore, at the instant when the square 65 is written, the validity information of the square 65 to the eraser 63 is enabled to be set "invalid" by operating the mouse 4 or inputting the command from the keyboard 3. Even if the user should operate the eraser 63 to erroneously delete a portion of the square, this operation is deemed invalid for the square 65 so that the square 65 is not deleted. Then, only the star 66 can be rewritten many times by the trial and error. Incidentally, reference numeral 51 appearing in FIG. 16(a) and 16(b) designates a cursor for changing the display drawing responsive to the selection of the icons.

Figure 17A:
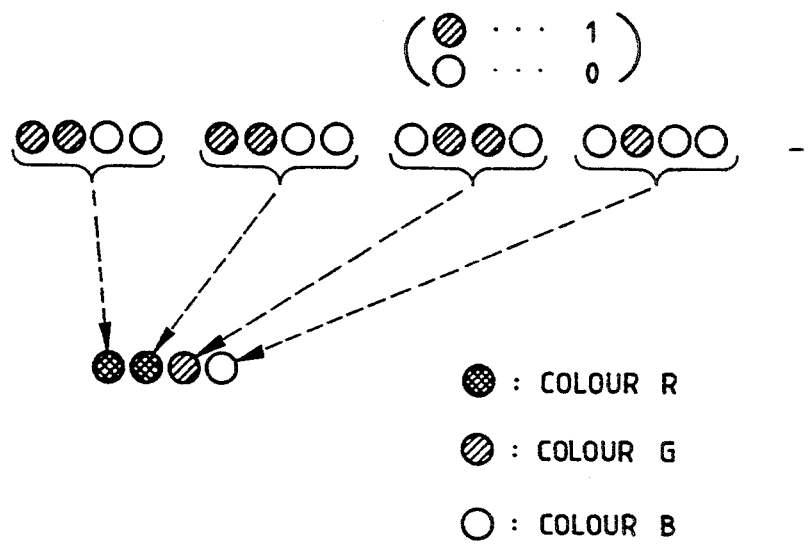

In the example shown in FIGS. 16(a) and 16(b), memory areas, in which the deletion with the eraser 63 is valid and invalid, may be formed and displayed in an overlapping manner. In the following embodiment, a bit indicating the validity and invalidity of the eraser is provided as the validity information for each pixel. Usually, it is assumed that four bits per pixel are used to display sixteen colors by mixing three colors R, G and B, as shown in FIG. 17(a). At this time, five bits are used for one pixel, and the fifth bit is used as the validity information of the eraser for the pixel.

Figure 17B:
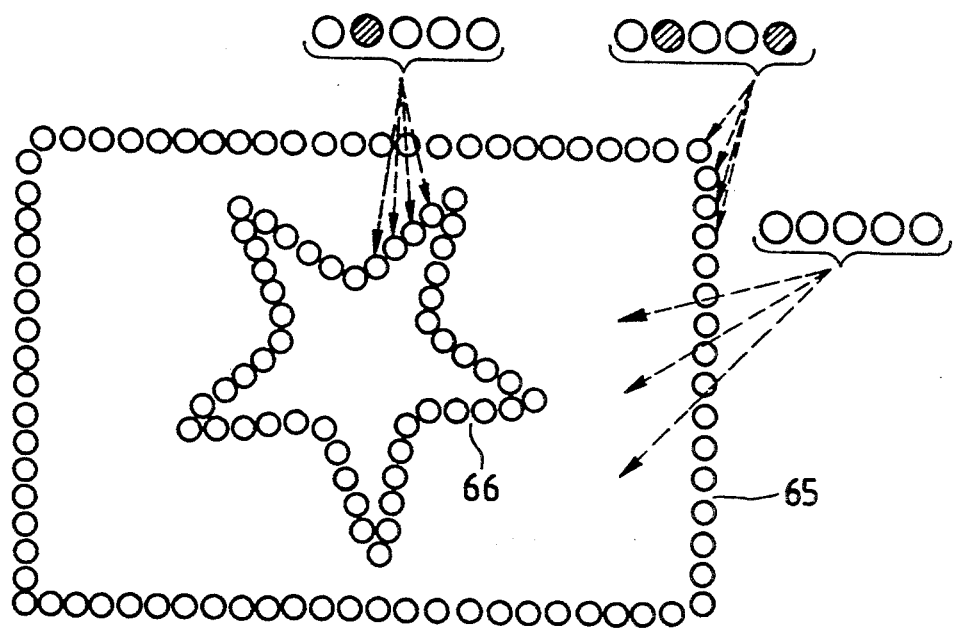

Specifically, as shown in FIG. 17(b), as to the square 65, the fifth bit (as indicated by circles at the most right-hand positions) is set at "1", and the deletion with the eraser 63 is invalidated. As to the star 66, the fifth bit is set at "0", and the deletion with the eraser 63 is validated. When a deletion is to be accomplished with the eraser 63, only that one of the pixels designated to delete, in which the fifth bit is at "0", has its first to fourth bits set wholly at "0" (or deleted), but no operation is accomplished to the pixels having the fifth bit at "1". Incidentally, the number of colors to be displayed may be reduced using the fourth bit as the valid information while leaving the number of bits for one pixel as it is.

The change in the written letter or drawing of the validity information may be designated by using the mouse or keyboard for each pixel. The area may be designated to set all the segments or points in the area valid or invalid. In case the overall drawing is held at the unit of letter or drawing, the letters (or their row) or drawing may be designated to change the content of the validity information for the letters or drawing designated.

On the other hand, the validity information of the letter or drawing to be written may be designated by setting the validity or invalidity modes and by changing the modes. Alternatively, either the validity or invalidity may be determined as a default to make a change by the aforementioned method after the writing operation.

The two embodiments thus far described are exemplified by utilizing the presence of the validity for the deletion, but FIG. 18 illustrates an example of utilizing the scale enlargement or reduction.

In the example shown in FIG. 18, a registration of seal impression is displayed in the screen 6. An area 67 defined by a thick frame is one in which the scale changing is set "invalid". If the whole registration is designated to reduce, as at 68, the portion other than that 67' defined by a thick frame is reduced, but the portion 67' is not. Thus, the efficiency of verifying the seal impression can be enhanced. In addition to the scale changing, moreover, the colors may be changed. Specifically, the colors of the portions other than the seal impression may be freely changed, but only the seal impression is determined red, as customary, so that its change to another color may be invalid.

Incidentally, in the example shown in FIG. 18, the validity information of the scale changing is stored as an attribute to the area for each drawing area but may be stored for each segment or pixel. Moreover, the content of the validity information may be freely changed by a command or the like.

In the examples thus far described, each of the letter, drawing or area in the document and one pixel have the validity information. In the following example, however, the document has the validity information (or rewriting attributive information) in its entirety for a specific operation.

FIG. 19(a) shows a document (which will be called "basic document") transmitted from a certain section of a company to another. This document itself is made so unrewritable for all that can be neither deleted nor changed, but valid for the overwriting. The leader of each section overwrites his comment on the document transmitted to him and sends it to his members by an electronic mail system, as shown in FIG. 19(b).

This function accomplished currently in the office to add a special superscription to the printed document and to circulate it will be exemplified in the following.

Figure 20A:
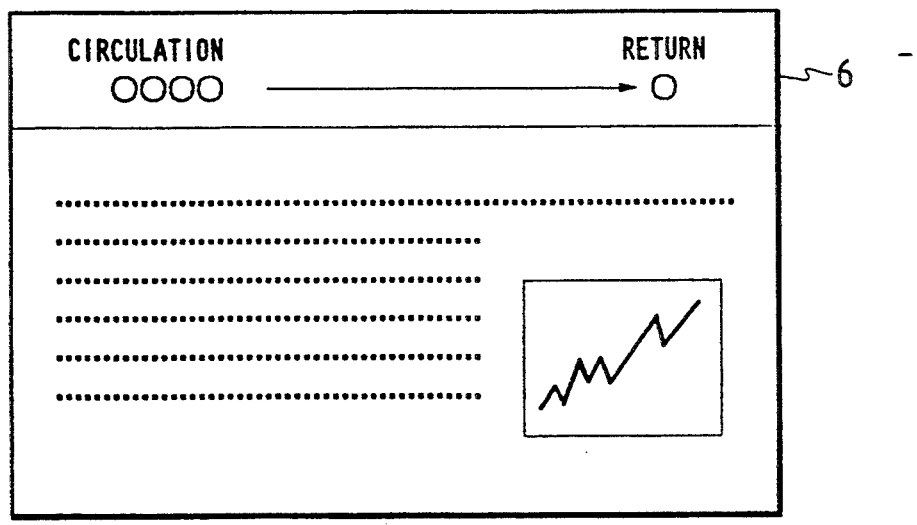
Figure 20B:
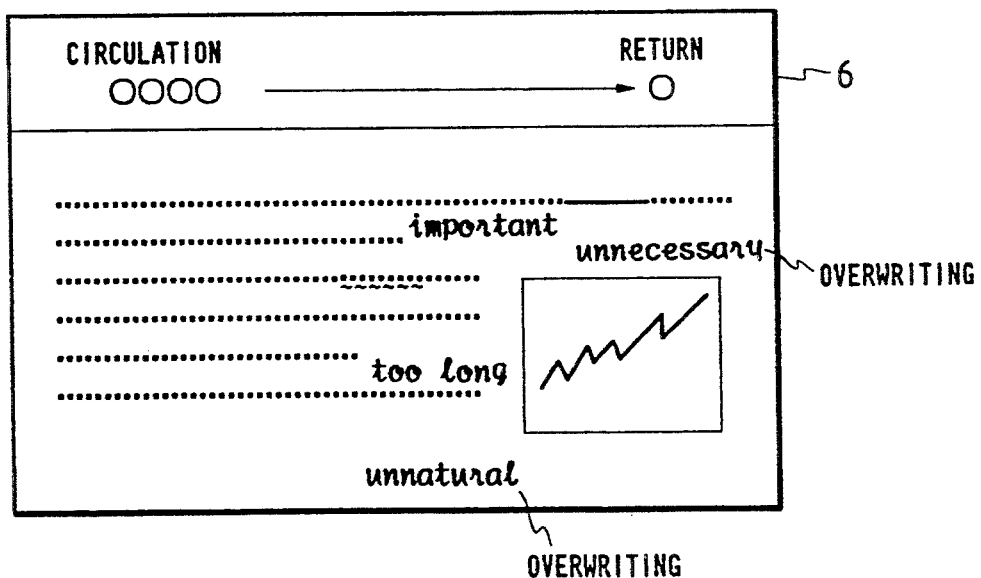

FIGS. 20(a) and 20(b) show an example in which the superscriptions are accomplished in several places. One document prepared by some member, as shown in FIG. 20(a), is transmitted by the electronic mail system to a plurality of members, each of whom overwrites his comment. If, in this case, deletions and/or changes are made many times, it is unknown how and what the original document (of FIG. 20(a)) is rewritten. This makes it necessary to leave the original document as it is with neither deletion nor change. Therefore, the original document is made invalid for the deleting and changing operations.

FIG. 20(b) shows an example of the display after circulations. The portion deleted with the double lines is strictly the superscription to leave the underlying basic document as it is. In this example, the superscription and the basic document are not displayed elaborately discriminably but may be discriminated with colors, line kinds or inversions. In response to a specific command, either the superscription or the basic document may be temporarily deleted. In case the plural members overwrite, only their own superscriptions may be deleted or changed. For identifications, an ID number is inputted, or an ID card is inserted. For the members, moreover, the display may be separately made with the colors or line kinds, and only the superscription of a specific member may be displayed or deleted responsive to a command input.

Figure 21A:
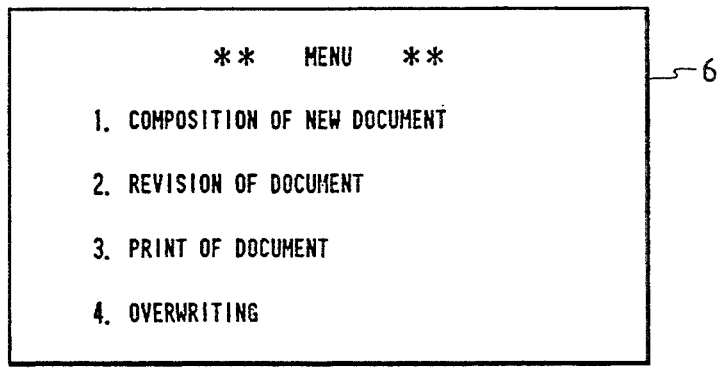

The overwriting operation may be accomplished by providing the keyboard 3 with an overwrite key as one function key to depress the key. As shown in FIG. 21(a), an overwriting mode is newly added to the mode of composition of a new document, the document of revision of document and so on so that the overwriting may be accomplished by selecting the overwriting mode.

Figure 21B:
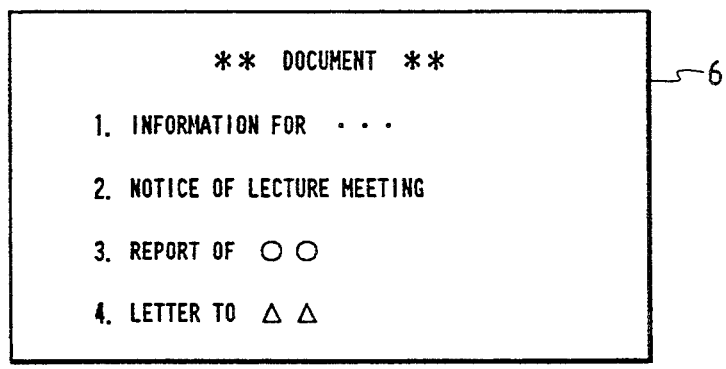
Figure 21C:
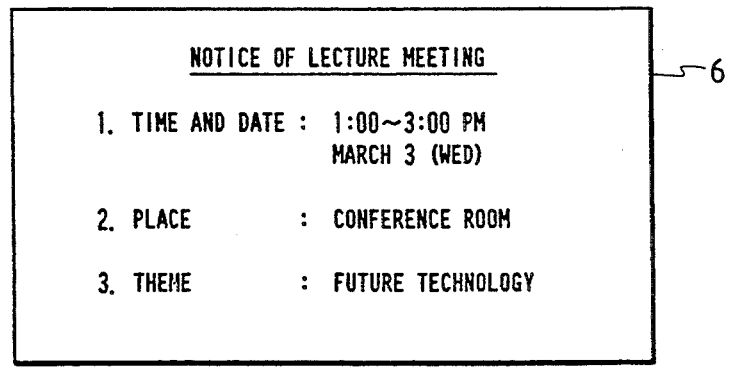

The document directory (as shown in FIG. 21(b)) to be displayed may list only the unrewritable documents or all the documents including the rewritable documents. For the unrewritable documents, only the overwriting mode may be selected. In the document directory when the document revision mode is selected, for example, only the rewritable documents are displayed but the unrewritable documents are not. Moreover, the overwriting attributive information indicating whether the overwriting is valid or not may be given to make only the overwritable documents overwritable.

Figure 21D:
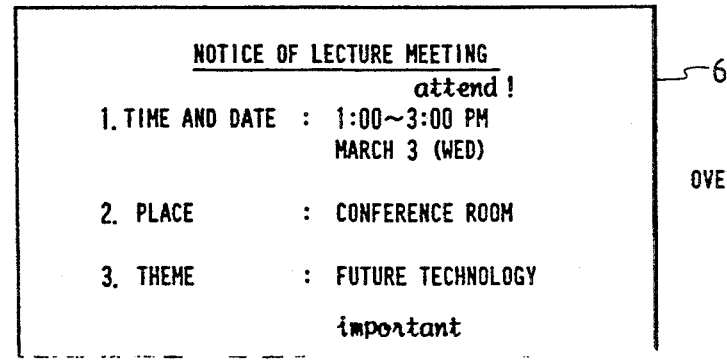
Figure 22:
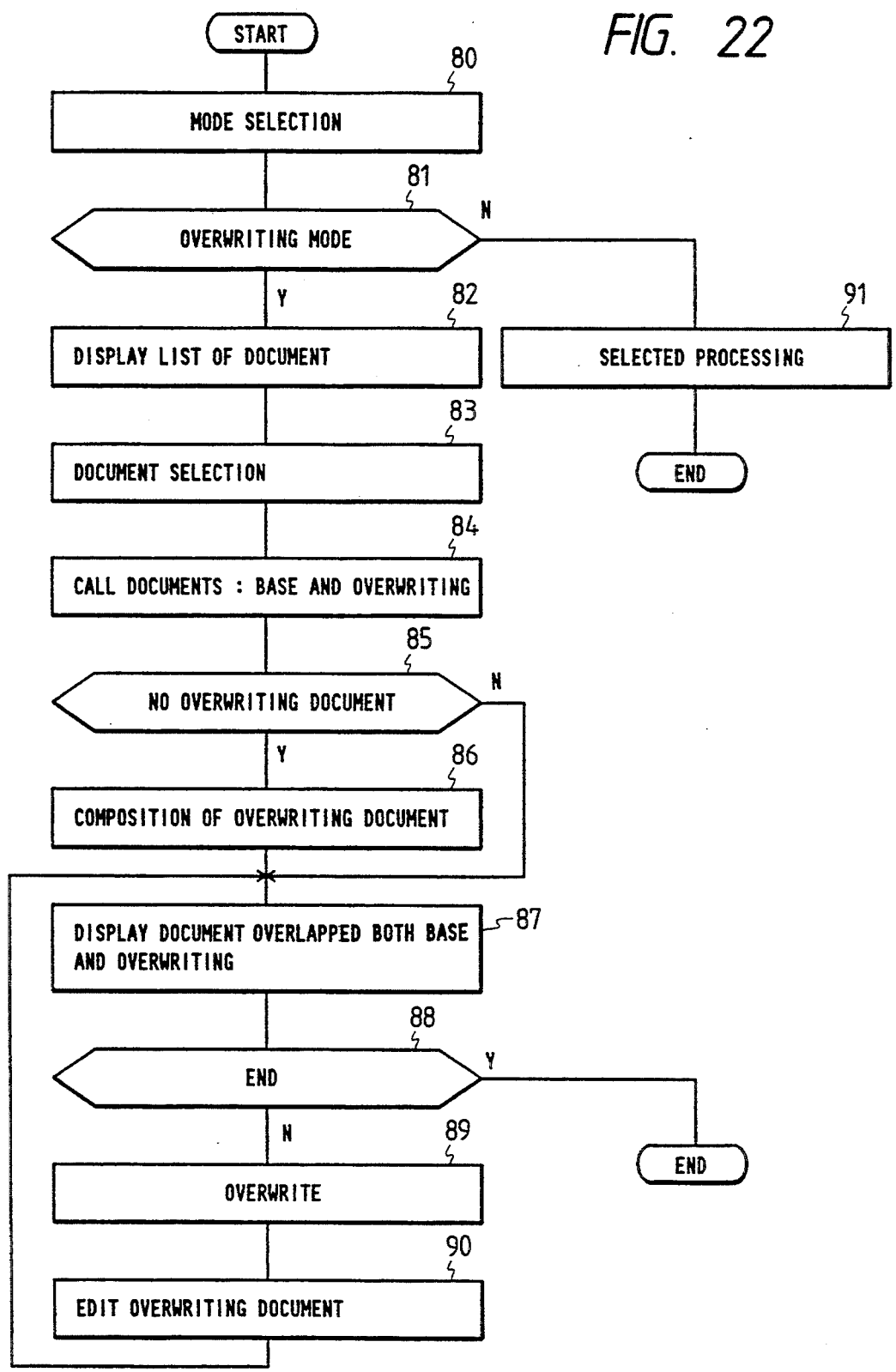
Figure 23:
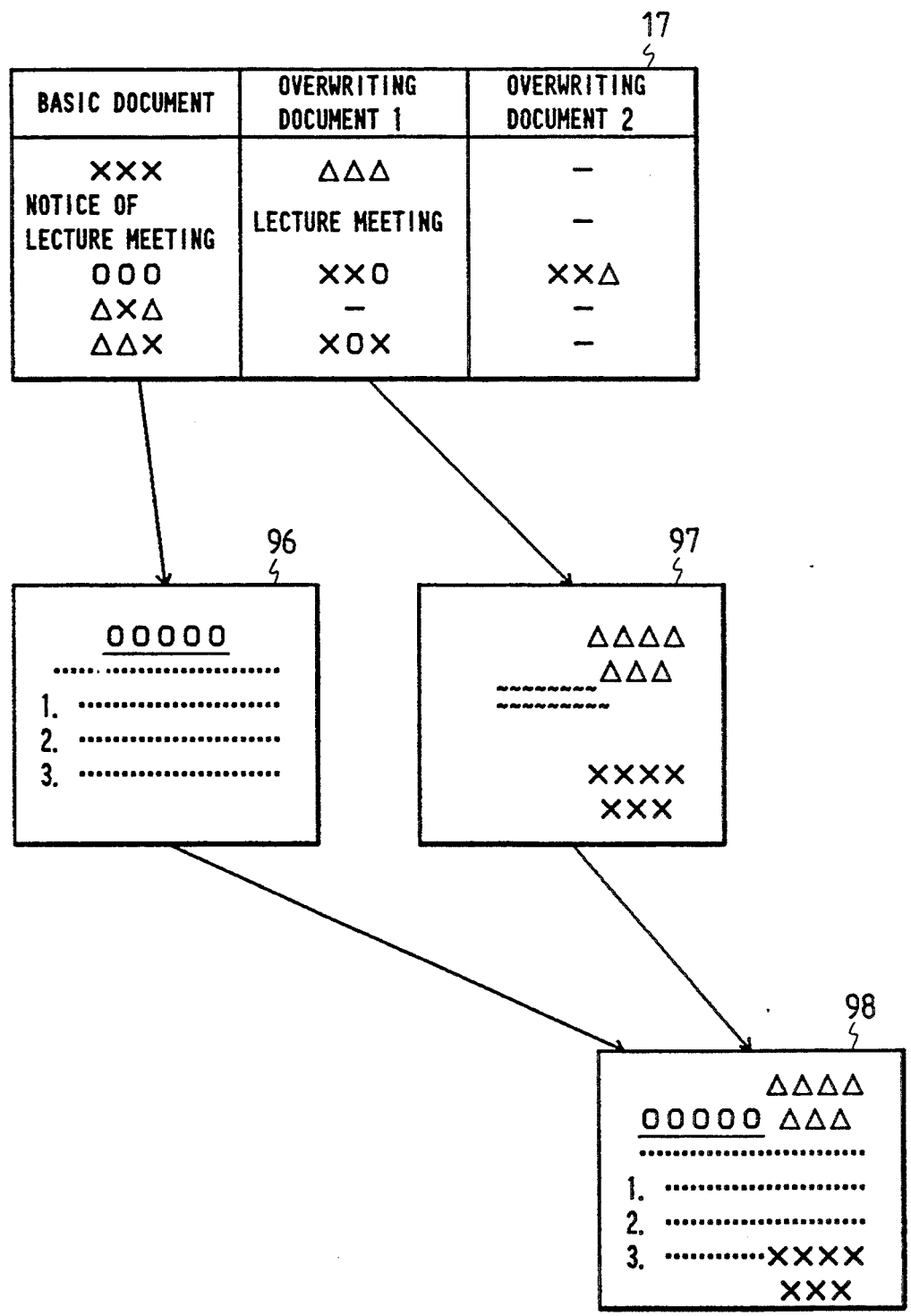

The flow chart for the overwriting procedures shown in FIGS. 21(a) to 21(d) is shown in FIG. 22. Moreover, the operation of displaying the screen from one basic document and overwriting documents is shown in FIG. 23.

First of all, the screen (FIG. 21(a)) for selecting the operation mode is outputted. The operation mode is selected (at Step 80) by the user. The operation mode is determined (at Step 81). If the mode is other than the overwriting mode, the processing corresponding to the selected mode is executed (at Step 91) and is ended. If the overwriting mode (i.e., the menu number 4 in the screen of FIG. 21), the document list (of FIG. 21(b)) is displayed (at Step 82). If the document is selected (at Step 83), the basic document corresponding to the selected item and the overwriting document are called (at Step 84). Here, the item 2 of FIG. 21(b) is selected to display the basic document of FIG. 21(c). In this example, it is assumed that the overwriting document corresponding to the item 2 of FIG. 21(b) be omitted. After the determination of Step 85, therefore, the overwriting document is composed (at Step 86). Next, the overwriting document composed is displayed (at Step 87) over the basic document, as shown in FIG. 21(d). At this stage, it is determined (at Step 88) whether or not the processing is to be ended. In a continuing case, the overwriting processing is executed again (at Step 89), and the overwriting document is edited (at Step 90), until the processing is returned to the Step 87.

The overlapped display of the Step 87 will be additionally described with reference to FIG. 23. The area of the overwriting control information 17 is stored with the title of the overwriting document corresponding to the title of the basic document. In the case of FIG. 23, two overwriting documents are enabled to correspond to each other, but the number is arbitrary. The basic document selected is designated at 96 in FIG. 23. The overwriting document corresponding to that basic document is designated at 97. The overlapped document of the documents 96 and 97 is designated at 98, as shown. Incidentally, this overlapping is based upon the OR-logic, as has been described hereinbefore.

According to the examples thus far described, the letters, drawings and points, in which a specific operation is valid and invalid, are enabled to coexist in the display screen. Thus, the function accomplished currently in the office to overwrite the printed document with a pencil or to complete an image gradually by preparing the image with a pencil and an eraser and by overwriting the prepared image with a pen can be realized by the word processor or personal computer so that the operability of the OA devices can be improved.

Since, moreover, a specific portion (e.g., an area, letter or drawing) of a document can be protected against a specific operation, the present invention is effective for administering not only a document to be examined or written by a plurality of users such as a document to be used as it is but also a document to be circulated or edited.

Although a variety of embodiments have been described hereinbefore, the validity of the displaying or deleting operation can be administered for the unit of information to be handled such as the window, letter row or drawing so that the operability of the system based upon the present invention can be enhanced to a remarkably high level. By making the overwriting operation possible, moreover, the utility of the office automation device can be further improved.

We claim:

1. A display control apparatus comprising:
a display terminal having a multi-window controlled screen;
means for selectively displaying a plurality of active windows;
first data representative of a status of the plurality of the active windows comprising an associated identity with an each of the plurality of windows, validity of display, non-validity of display, overlapping order of relative display of the plurality of the windows from front to back on the screen and nonvisibility of a valid one of the plurality of windows, wherein the first data indicates whether or not each of said plurality of windows should be validly displayed and visible on said display terminal;

a memory for storing said plurality of windows and the first data corresponding to each of said plurality of windows; and a processor connected to said display terminal and said memory, for displaying (1) at least one of said plurality of windows stored in said memory on said multi-window controlled screen of said display terminal, and (2) a display symbol distinct from the windows having a selectively variable appearance in accordance with the first data representative of the window status.

2. A display control apparatus according to claim 1, further comprising:

inputting means connected to said processor for inputting second data designating one of said plurality of windows, wherein said processor changes said first data stored in said memory so that no window, which is predetermined to be displayed on the front side of said one window designated by said second data, is displayed on said multi-window controlled screen of said display terminal.

3. A display control apparatus according to claim 1, wherein said processor displays said first data on said multi-window controlled screen of said display terminal whereby the relation between said first data and each of said plurality of windows is visible by said display symbol.

4. A display control method of a multi-window controlled screen, comprising the steps of:

storing in a memory first data representing user drafted data comprising information to be displayed in a one of the windows and second data indicating overlapping order, position and size of an each of the windows which can be displayed on the screen;

selectively displaying the plurality of the windows on the screen according to the overlapping order, position and size stored in the memory;

further displaying on the screen a plurality of icons, each of which indicates identity, validity of the window, non-validity of the window, and visibility of an associated each of the windows by a selectively variable icon appearance, the validity comprising at least two kinds, a first kind indicating whether the window is selected as foremost among the overlapping order and thereby visible to a user, and a second kind, indicating the window is displayed and at least partially unseen for being overlapped by the foremost window;

inputting a designation of one of the icons;

obtaining from the memory an overlapping order of the windows resulting from the inputting of the designated icon;

changing the validity of some windows to non-validity wherein the some windows have an overlapping order in front of the window corresponding to the designated icon, and correspondingly varying the appearance of some icons indicating the some windows;

deleting from the screen the some windows having non-validity of display; and, displaying remaining windows retaining validity of display on the basis of the each overlapping order, position and size stored in the memory.

5. The display control method according to claim 30, further comprising the steps of:

inputting a designation of another one of the some icons indicating non-validity of window display;

obtaining from the memory another overlapping order of another window corresponding to the another designated icon as foremost;

changing the non-validity of the another window to validity and correspondingly changing the appearance of the another one of the some icons, and changing the non-validity to validity of any of the some windows having an overlapping order of display behind the another window and correspondingly changing the appearance of the icons associated therewith; and, displaying the another window and the any of the some windows on the basis of the overlapping order, position and size stored in the memory.

6. The display control method according to claim further comprising:

changing the validity of a previously foremost window from the first kind to the second kind wherein the previously foremost window has an overlapping order behind the window corresponding to the designated icon, and correspondingly varying the appearance of the icon indicating the previously foremost window and the designated one of the icons.

7. A display control method of a multi-window controlled screen, comprising the steps of:

determining first data representative of a status of a plurality of active windows which are selectively viewable on the screen comprising an associated identity with an each of the plurality of the active windows, validity of display, nonvalidity of display, overlapping order of relative display of the plurality and nonvisibility of a valid one of the plurality, wherein the first data is thereby indicative of whether each of the plurality of active windows should be validly displayed and visible on the screen;

displaying said first data separately from said windows as a first icon having a selectively variable appearance in accordance with the window status;

selectively changing the first data upon selection of an other icon representative of an other window when the selection invalidates the display of a one window;

selectively changing the variable appearance of the first icon to indicate invalidity of display of the one window when the overlapping order of the other window is greater than the one window; and, displaying said icons on said multi-window controlled screen wherein the first data is recognizable by a user from a viewing of the icons.

8. A display control method of a multi-window controlled screen, comprising the steps of:

determining a position and overlapping order of each of a plurality of active windows to be displayed, said overlapping order being one in which said plurality of windows are displayed on said multi-window controlled screen, from the front to back sides of said multi-window controlled screen;

determining first data indicating validity of display which shows whether a one of said plurality of windows should be displayed, the overlapping order of display, and nonvisibility for a window having a valid display and a certain overlapping order in back of a viewable and selected window;

displaying said first data separately from said information as an icon having a selectively variable appearance wherein the windows are identifiably represented by associated icons;

inputting second data designating a second of said windows;

amending said first data so that said one window, if determined to have an overlapping order on the front side of said second window, has the first data comprising an invalid display; and, displaying said plurality of windows on said multi-window controlled screen in accordance with said position and said overlapping order, responsive to said first data and said second data whereby the relations between the first and second data and the first and second window are visible to a user from the icons.

* * * * *

UNITED STATES PATENT AND TRADEMARK OFFICE
CERTIFICATE OF CORRECTION

PATENT NO. : 5,412,775
DATED : May 2, 1995
INVENTOR(S) : Miyuki Maeda, et al.

It is certified that error appears in the above-indentified patent and that said Letters Patent is hereby corrected as shown below:

Claim 6, column 16, line 19, after "claim" insert --4--.

Signed and Sealed this

Eighth Day of August, 1995

Attest:

BRUCE LEHMAN

Attesting Officer          Commissioner of Patents and Trademarks